United States Patent
White et al.

(10) Patent No.: US 7,549,077 B2
(45) Date of Patent: Jun. 16, 2009

(54) AUTOMATED SELF-FORMING, SELF-HEALING CONFIGURATION PERMITTING SUBSTITUTION OF SOFTWARE AGENTS TO EFFECT A LIVE REPAIR OF A SYSTEM IMPLEMENTED ON HARDWARE PROCESSORS

(75) Inventors: Barry C. White, Vicksburg, MS (US); Barry W. McCleave, Vicksburg, MS (US); Laura E. McCleave, legal representative, Vicksburg, MS (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 537 days.

(21) Appl. No.: 11/116,171

(22) Filed: Apr. 22, 2005

(65) Prior Publication Data

US 2006/0242225 A1 Oct. 26, 2006

(51) Int. Cl.
*G06F 11/00* (2006.01)
(52) U.S. Cl. .......................................... 714/4; 714/10
(58) Field of Classification Search .................. 714/4, 714/10
See application file for complete search history.

(56) References Cited

U.S. PATENT DOCUMENTS

| | | | | |
|---|---|---|---|---|
| 6,006,259 | A * | 12/1999 | Adelman et al. | 709/223 |
| 6,088,330 | A * | 7/2000 | Bruck et al. | 370/228 |
| 6,134,673 | A * | 10/2000 | Chrabaszcz | 714/13 |
| 6,314,526 | B1 * | 11/2001 | Arendt et al. | 714/4 |
| 6,728,207 | B1 | 4/2004 | Askinger et al. | |
| 6,789,212 | B1 | 9/2004 | Klingman | |
| 7,016,946 | B2 * | 3/2006 | Shirriff | 709/221 |
| 7,120,821 | B1 * | 10/2006 | Skinner et al. | 714/4 |
| 7,386,757 | B2 * | 6/2008 | Lindenstruth et al. | 714/6 |
| 2002/0097613 | A1 | 7/2002 | Raynham | |
| 2002/0097673 | A1 | 7/2002 | Suzuki | |
| 2002/0131409 | A1 | 9/2002 | Frank | |
| 2002/0174207 | A1 | 11/2002 | Batton | |
| 2002/0191536 | A1 | 12/2002 | La Forge et al. | |
| 2003/0021227 | A1 | 1/2003 | Lee et al. | |
| 2003/0021251 | A1 | 1/2003 | Moshiri-Tafreshi et al. | |
| 2004/0066741 | A1 * | 4/2004 | Dinker et al. | 370/216 |
| 2004/0103338 | A1 | 5/2004 | Chalasani et al. | |
| 2004/0123285 | A1 | 6/2004 | Berg et al. | |
| 2004/0136319 | A1 | 7/2004 | Becker et al. | |
| 2004/0153558 | A1 * | 8/2004 | Gunduc et al. | 709/229 |
| 2004/0153823 | A1 | 8/2004 | Ansari | |
| 2006/0235997 | A1 * | 10/2006 | Munirajan et al. | 709/245 |
| 2007/0226359 | A1 * | 9/2007 | Gunduc et al. | 709/229 |

* cited by examiner

*Primary Examiner*—Joshua A Lohn
(74) *Attorney, Agent, or Firm*—Earl H. Baugher, Jr.

(57) ABSTRACT

A configuration for use with a processor that incorporates a suite of "flat" hardware architecture and superimposes thereon a self-forming, self-healing, hierarchical architecture implemented in software. Embodiments may be employed in various applications, such as maintaining network integrity. In one embodiment, a building security monitoring network provides for automated network agents to each be capable of communication with any other automated agents on a network at network startup. Shortly after network initialization, the software architecture is superimposed on the flat hardware architecture, re-arranging communication links to provide an efficient hierarchy of control and substituting working agents for compromised agents as necessary in the network. All of this is done in a "live" network, not requiring shutdown, or even reduced operation to accomplish. This "dual" architecture (hierarchical software and flat hardware) provides excellent reliability in those "layered" network applications requiring near total reliability, such as security surveillance.

24 Claims, 6 Drawing Sheets

AUTOMATED SELF-FORMING, SELF-HEALING CONFIGURATION PERMITTING SUBSTITUTION OF SOFTWARE AGENTS TO EFFECT A LIVE REPAIR OF A SYSTEM IMPLEMENTED ON HARDWARE PROCESSORS

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Phillip Stewart at 601 634-4113.

BACKGROUND

Many human-computer interfaces today are programmed in standard sequential or object-oriented software. Another software paradigm exists, known generally as an agent-based software architecture. A given task is divided up into several sub-tasks and assigned to different "agents" in the system. Agents communicate concurrent modules, each of which handles a part of the decision-making process. "Intelligent agents" may be representative of software that mediates between a user and a software system and undertakes tasks that the software system cannot fulfill on its own. The use of such an intelligent agent as a mediator facilitates and simplifies one's task, thus increasing productivity. If the agents are capable of learning, they are referred to as adaptive agents. Some examples of situations in which agent-based interaction have been used follow.

Agents "manage" the customized presentation of information. They preprocess data and display it in a way that is unique for each user. Agents act as tutors or guides, supplementing knowledge of a user with their own. They assist in accomplishing a current task by providing alternative views and additional relevant information. Agents may be used for adaptive search and information retrieval.

One application of agents in user interaction is concentrating a bulk of interaction responsibilities in a single agent, thus emulating a centralized architecture. However, many real world scenarios are best modeled using a set of cooperating intelligent systems or "managers." Society, for example, consists of many interacting entities, e.g., managers. To model some aspects of society, it is desirable to structure the model to interact among the desired entities. Further, since data often originates at different physical locations, centralized "management" solutions are often inapplicable or inconvenient. Thus, using a number of small simple adaptive agents ("middle managers") instead of one large complicated one ("director") simplifies the process of solving a complex problem. In summary, a cadre of agents collectively exhibit emergent behavior that as a whole is greater than the sum of its parts.

Embodiments of the present invention use interacting agents in a "virtual architecture" riding on top of a network to form semi-optimal decision trees for fast and reliable communication. In applications required to be fully operational at all times, such as applications used by security personnel, this is especially advantageous. A general application of select embodiments of the present invention substitutes agents of equivalent or greater control (or "management") capacity for those agents in a network that have been, or appear to be, compromised.

DETAILED DESCRIPTION

In select embodiments of the present invention, a self-healing configuration comprises uniquely identifiable elements that cooperate to accomplish one or more tasks, each element having one or more functions. Each element is able to communicate with any other element via one or more links, but a reduced number of links is used in operation upon superimposing on the elements one or more architectures implemented in software. These one or more architectures specify which links are employed in a particular operating scenario of the configuration. For example, upon compromise of one or more elements during operation of the configuration, one or more specified un-compromised elements "seamlessly" assumes one or more functions of the compromised elements.

In select embodiments of the present invention, the configuration has at least part of each of the elements implemented in hardware. One or more of the functions of each element include a control function.

In select embodiments of the present invention, the configuration is a network and the elements are agents in the network, each agent maintaining an IP address and one or more databases with one entry in one or more of the databases being the class of the agent. One or more of the architectures is a hierarchical architecture.

In select embodiments of the present invention, a self-healing network comprises agents that cooperate to accomplish at least one task and one or more architectures implemented in software to specify which links are employed in a particular scenario. Each agent maintains an IP address and one or more databases with one entry in one or more of the databases being the class of the agent. Each agent has at least one function and is able to communicate with any other agent via one or more links. One or more specified agents assumes one or more functions of any agent that is compromised during operation of the self-healing network. In select embodiments of the present invention, the agents, at least in part, are implemented in hardware and one or more of the functions is a control function. In select embodiments of the present invention, one or more of the architectures is a hierarchical architecture.

Further provided in select embodiments of the present invention is a first method for establishing a self-healing configuration. The method comprises arranging uniquely identifiable elements in one or more arrays to facilitate accomplishing one or more tasks, each element having one or more functions and able to communicate with any other elements via one or more links. One or more architectures implemented in software is superimposed upon the arrays. The architectures specify which links are employed in a particular scenario and specify one or more of the elements to assume one or more functions of those elements compromised during operation of the configuration. The elements, at least in part, are implemented in hardware and one or more of the functions includes a control function. The configuration of this method may be implemented from a network incorporating linked agents, each agent maintaining an IP address and one or more databases with one entry in one or more of the databases being the class of the agent. Further, the method may employ one or more hierarchical architectures.

Further provided in select embodiments of the present invention is a method for establishing a self-healing network. This method comprises arranging uniquely identifiable agents in one or more first networks, superimposing one or more architectures upon the first networks, and specifying one or more of the agents to assume one or more functions of the agents compromised during operation of the self-healing network. Each agent maintains an IP address and one or more databases with one entry in one or more of the databases being the class of the agent. The architectures are implemented in software to specify which links are employed in a particular scenario, each agent having one or more functions and ability to communicate with other agents via one or more links.

In select embodiments of the present invention, at least parts of the agents are implemented in hardware and one or more of the functions is a control function. Further, in select embodiments of the present invention, the method implements one or more of the architectures as a hierarchical architecture.

In select embodiments of the present invention, a self-forming, self-healing, "virtual" (software) hierarchical architecture built from a suite of specialized agents may be employed in various applications where maintaining integrity of a network is desired. At all times a "flat" physical (hardware) agent architecture, comprising specialized agents, provides for all agents to be interoperable (each one in operable communication with each of the other agents) on a network so that at network initiation with 100% operation of all agents, each agent may communicate with all other agents. Such a network may be localized or worldwide.

Shortly after network initialization of networks employing embodiments of the present invention, a software hierarchical agent architecture is superimposed on (rides on) the flat hardware architecture. This "dual" architecture (hierarchical software and flat hardware) provides excellent reliability in those "layered" network applications requiring near total reliability, such as security surveillance. In select embodiments of the present invention, the network is scalable, i.e., select virtual hierarchical levels (layers or shells) may be changed via software to add or subtract nodes, as needed, through a self-forming attribute.

In select embodiments of the present invention, a short time after initializing the network, "self-forming" rules prohibit universal communication among agents and force agents to act in a hierarchical network, enabling communications only via specified paths. That is, in "typical" operation of embodiments of the present invention, an agent on one level may communicate only with all agents reporting to it from the immediately lower level and only with the one agent on the immediately higher level to which it reports. Should an agent be compromised, the number of available agents to report to for handling the compromised agent's tasks or sub-agents (immediately lower level), if any, is quickly reduced to only those in immediate proximity by implementing a set of "self-healing" (collaboration) rules in accordance with an embodiment of the present invention.

EXAMPLE I

In select embodiments of the present invention, a system akin to distributed computing is provided with messaging between processes. The messages determine which agents may communicate and guarantee that agents are able to send messages up and down the tree. As separate processes, each having its own rules for processing data, embodiments of the present invention provide an "object-oriented" information system.

Figure 1:
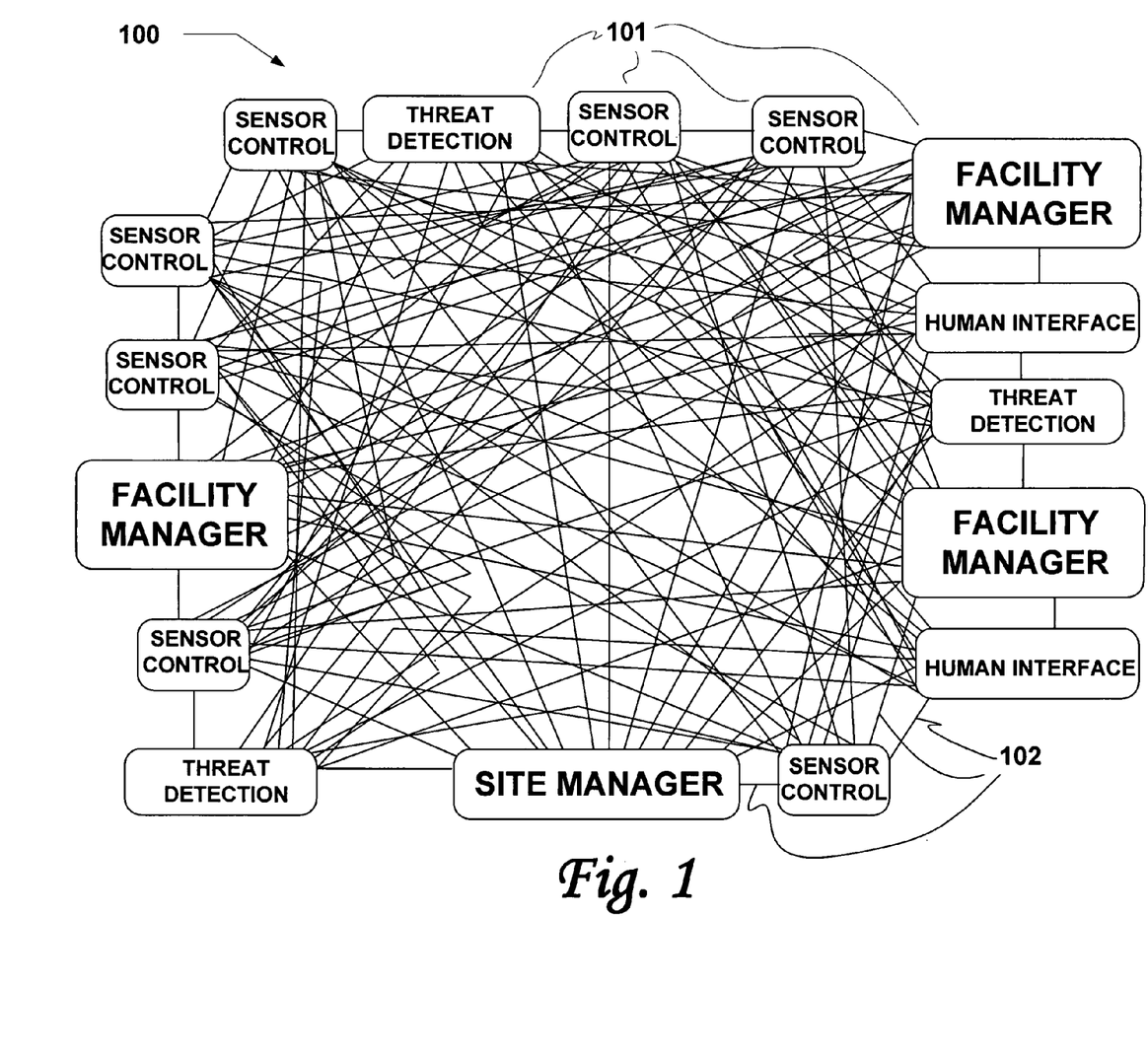
FIG. 1 shows an example "flat" agent architecture that may be employed at startup of a network employing an embodiment of the present invention.

Refer to FIG. 1 depicting an example of the "flat" agent architecture 100 of a site's security network 100 at initialization. In select embodiments of the present invention, the network employs the flat agent architecture 100, "formed" in hardware, only at the moment of initialization of the network. That is, at initialization of the network, all agents 101 are "physically" interconnected via "links" 102 for interoperable communication one to any other. Selected "physical" connections (links) may be intangible, e.g., via electromagnetic waves in the RF or light spectra and the like.

Agents 101 shown in the example of FIG. 1, include Sensor Control, Threat Detection, Facility Manager, Site Manager, and Human Interface. Note that all agents 101 are "managers" in the sense that they have supervisory (control or mid-level reporting) responsibility for at least one controlled (lower level) element (either "non-supervisory workers" or lower-level managers). Note that "sensors" that are controlled by Sensor Controls 101 are not shown in FIG. 1, but the sensors would have "links" 102 to the Sensor Controls 101 to which they are assigned. Typically, sensors would not be agents 101, and for purposes of illustration in this example they are not. Thus, all lower level non-supervisory elements may not be included in the virtual hierarchical architecture although "hardware" links 102, including wireless links 102, are most likely run to them. Thus, although the network of FIG. 1 illustrates controllers (taskers), it does not illustrate "taskees" (workers) with no control (supervisory) function. Although these types of workers are not shown on the network, in select embodiments of the present invention redundancy or overlap could be provided in software to have select first-level (non-supervisory) workers assume one or more tasks of compromised neighboring workers.

Using rules to implement a "self-forming hierarchical agent architecture" in software, embodiments of the present invention superimpose a "virtual" hierarchical agent architecture upon the flat "physically-connected" (hardware) architecture 100, the latter present right at initiation (power up) of the network. Once built, the self-forming and self-healing virtual agent architecture maintains a "living" network, i.e., it accepts new agents 101 (or the loss of existing ones) without having to interrupt operations, such as powering down. Network formation is based on virtual network formation rules embedded in the operating software. Each agent 101 abides by these rules so that the ambient state of the network at any instant of time shortly after initiation of the network appears as a fixed "virtual hierarchical agent architecture" for the network.

In select embodiments of the present invention, two types of agents 101 are provided to form a self-forming, self-healing, efficient communication framework for hierarchical decision making among agents 101. These agent types are generic enough that they may be created in any agent formation package on condition that specific functionality is provided. These agents 101 must be capable of opening two connections. A server connection must be established to listen for conversations from other agents 101. A client connection is created to converse with other agents 101. In a seeming role reversal, the server will accept messages from the client connection of another agent 101.

In select embodiments of the present invention, the two types of agents 101 are a first type that may be termed the Agent Name and Type Server (ANATS) agent 101 and a second type that may be termed the Hierarchical Self-Healing Network (HSHN) agent 101. The ANATS agent 101 maintains a directory of existing HSHN agents 101, including their type. When a request is received for an HSNS agent 101 of a certain type, e.g., Threat Assessment 101, from another agent 101, the ANATS agent 101 sends the directory entry for that agent 101 to the requesting agent 101. When a directory entry has been made, a countdown timer on how long it is "trusted to still exist" is started. When a pre-specified time is counted down, the directory entry state is moved from the current status to the next lower status, e.g., "exists" to "unconfirmed" to "non-existent," and the timer is restarted. A "grace copy" is an unconfirmed entry.

In select embodiments of the present invention, the ANATS agent's rules, presented in order of priority, are:
1) If an HSHN agent's directory entry timer has reached zero and it is an unconfirmed entry, remove it from the list.
2) If an HSHN agent's directory entry timer has reached zero and it is not a grace copy, send a verification request and make its entry in the list an "unconfirmed."
3) If an agent 101 sends an "IamHere" message, add it to the name list and if there is an existing copy or grace copy, remove them, and reply with an "ANATSConfirm" message.
4) If an agent 101 sends an "AgentFromType" message, then return the next instance of the requested type of agent 101 in an "AgentFromTypeResponse" message.

In this fashion, an agent's existence is verified and an entry returned based on agent type. Because the ANATS agent 101 is a directory to the agents 101 that will form a decision tree, it is protected so that hot swappable copies are maintained.

The second type, i.e., the HSHN agent 101, actually forms the decision tree. The tree formation rules are the same at any level of the structure. If the rules for the first agent 101, i.e., the ANATS agent 101, are designed well, promotion and demotion in the tree is possible. There are three sets of rules for this second type, in descending priority. The first, or ANATS rules, establish the connection of the HSHN agent 101 with the ANATS agent 101. The second set of rules is the Parent Processing rules. These rules permit an agent 101 to find and establish a connection with the layer of agents 101 above it, i.e., their "parent agents 101." If the agent 101 is at the root layer, it can ignore these rules because it does not have a parent. The third set of rules is the Parenting rules. These rules allow a parent agent 101 to track its child agents 101 and verify their existence. The lowest level agents 101 (outermost "leaves") ignore these rules because they have no child agents 101.

In select embodiments of the present invention, ANATS Rules for an HSHN agent 101 are:
1) If the ANATS agent 101 has not acknowledged this agent's existence and the message timer has not expired, wait for a response (Note: an agent 101 has a perception of its environment. This perception includes what agents 101 exist in its environment, therefore it has to be aware of the state of existence of another agent 101);
2) If the ANATS agent 101 has not acknowledged this agent's existence, and the message timer has expired, send a message to the ANATS agent 101 and start a wait timer;
3) If a confirmation is received from the ANATS agent 101, set an acknowledgement flag to ignore the first two rules; and
4) If the ANATS agent 101 requests proof of this agent's existence, reset an acknowledgement flag so that rule 2 is activated. (Note: This loops endlessly if the ANATS agent 101 does not exist, because an ANATS agent 101 must exist for the system to function. This is consistent for a standalone agent 101, which is only terminated by errors or user interaction. If this agent 101 dies, the ANATS agent 101, after the timer has finished, changes this agent's status to "non-existent" and removes it from the system.)

In select embodiments of the present invention, Parent Processing Rules are:
1) If the parent state is "unconfirmed", and a message is sent to the parent agent 101, wait for a response from the parent agent 101;
2) If the parent state is "non-existent" then request a new name from the ANATS agent 101;
3) If the parent state goes to "unconfirmed," then send a message to the parent agent 101 for confirmation from the parent agent 101;
4) If the ANATS agent 101 sends a parent agent's name, and the current parent state is "nada", then replace the current parent agent 101 with the new parent agent 101 and set its state to "unconfirmed" and send a message for confirmation from the parent agent 101;
5) If the current parent agent 101 responds, set its state to "exists;" and
6) If the parent agent 101 requests confirmation of this agent's existence, then set parent agent 101 state to "unconfirmed" and send a message for confirmation from the parent agent 101.

In select embodiments of the present invention, Parenting Rules are:
1) If a child agent's state goes to "non-existent" then remove the child agent 101 from this parent's list of children;
2) If a child agent's state goes to "unconfirmed", send a request for a child verification message to the child agent 101;
3) If a child agent 101 sends a message to the parent agent 101, then if the parent agent 101 is capable, it adds the child agent 101 to its list with the state "exists" (removing prior entries of the same child agent 101) and responds with a parent agent 101 confirmation message.

Note that in the above embodiments of the present invention, these rules do not take load or tree balancing into effect, but additional rules could easily take this into account by sending messages to child agents 101 that invalidate the current parent agent 101, for example.

Figure 2:
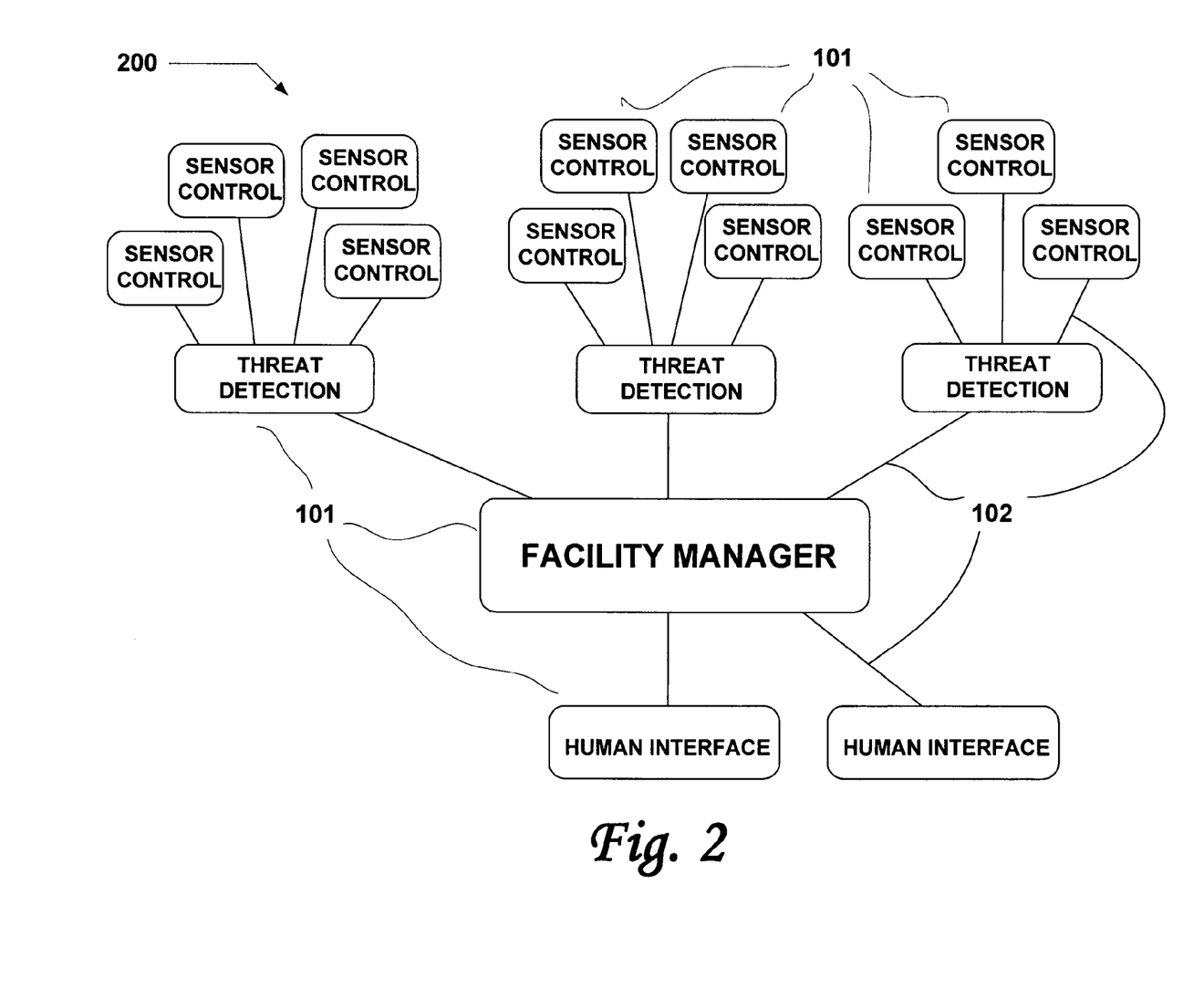
FIG. 2 depicts a part of the network of FIG. 1 as initially organized in a virtual hierarchical architecture by an embodiment of the present invention.

Refer to FIG. 2 for an example of a virtual hierarchical agent architecture 200 that may be employed in select embodiments of the present invention for a three-level portion of the network of FIG. 1. FIG. 2 illustrates a single Facility Manager agent 101 "controlling" Threat Detection and Sensor Control agents 101 at intermediate and lower levels, respectively, as formed virtually via software in a hierarchy. The Facility Manager 101 may be below a Site Manager 101 at the next higher level (layer) in the virtual architecture 200. The Human Interface 101 need not be positioned in a particular "layer" in the virtual hierarchical architecture 200, but rather may be a fixed link 102 to select agents 101, such as the Facility Manager 101, as shown in FIG. 2 and both the Facility Manager 101 and Threat Detection 101 as in FIG. 3.

In select embodiments of the present invention, once the virtual hierarchical architecture is superimposed, each agent 101 typically has access to only a specified subset of all available hardware communication links 102. A virtual hierarchy is established in levels (layers or shells). For the example of FIG. 2, the lowest layer illustrated comprises the Sensor Control agents 101. Each of these is linked to a particular Threat Detection agent 101. In surveillance applications, such as used for buildings, there is one Threat Detection agent 101 per room in a building. The Sensor Control agents 101 for that room are associated with a Threat Detection agent 101 via network formation rules embedded in software.

Figure 3:
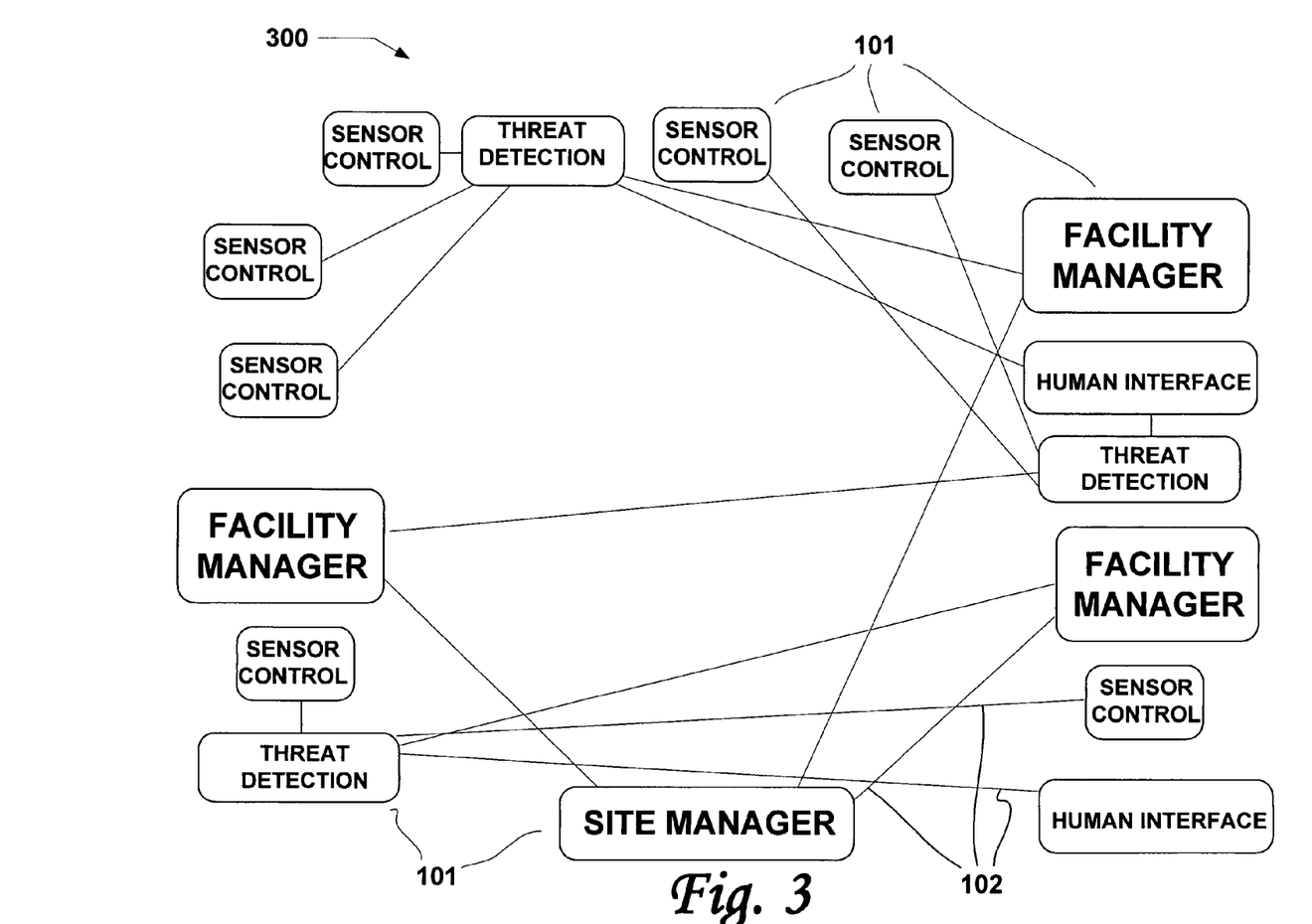
FIG. 3 illustrates possible communications paths between agents for the network of FIG. 1 as fully operational via employment of an embodiment of the present invention.

FIG. 3 shows a stage 300 of the surveillance network of FIG. 1 as it is being formed in software. Initially upon superimposing the virtual architecture, only those links 102 necessary for establishing the hierarchy are enabled, inactivating many of the links 102 shown in FIG. 1. Embodiments of the present invention employ a "living" network, i.e., the self-healing function changes assignments of agents 101 automatically, enabling and disabling links 102 as necessary, if one or more agents 101 are compromised. For example, consider a large building with several floors, with Facility Manager agents 101 for each floor and a Site Manager agent 101 for the entire building.

Figure 4:
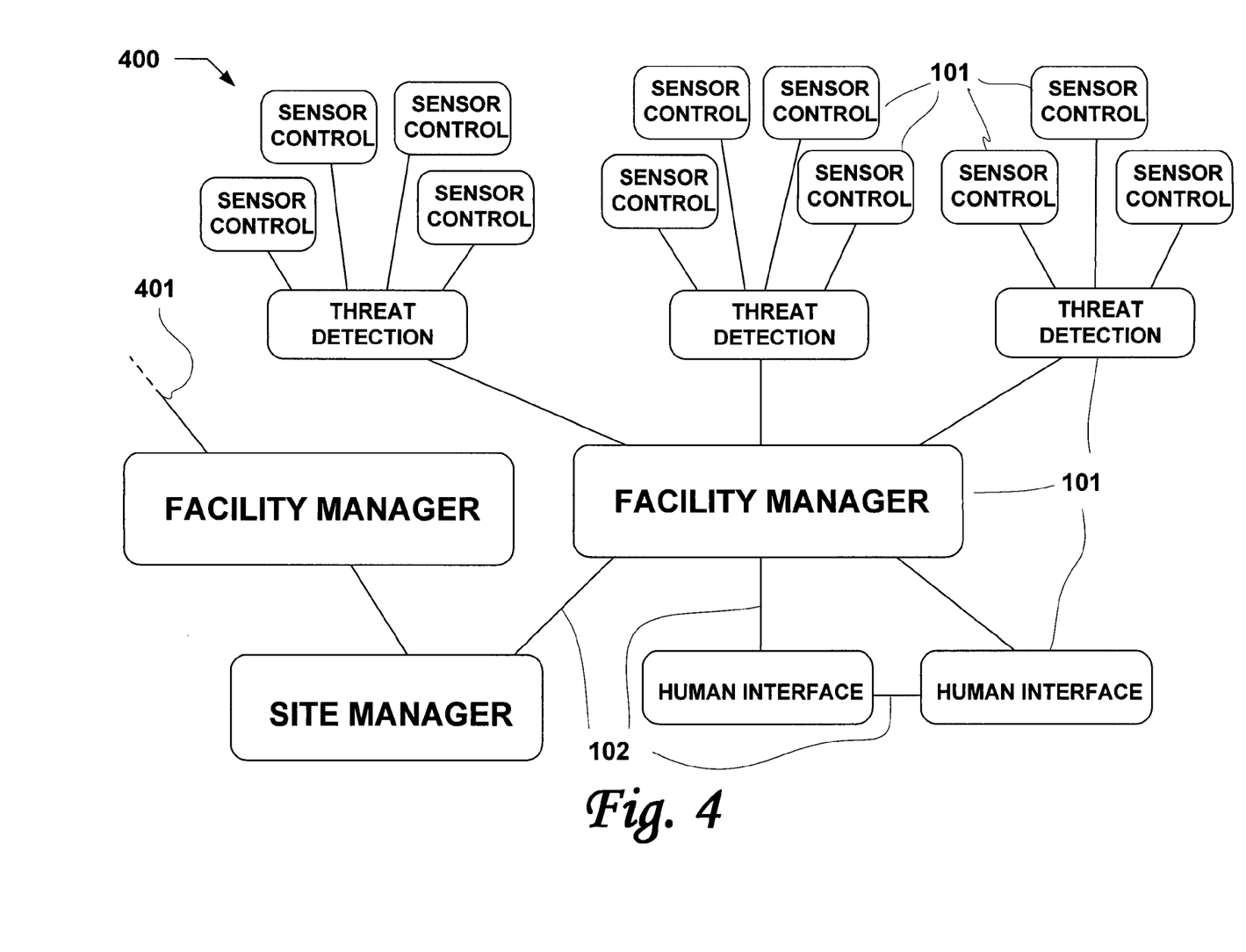
FIG. 4 adds a level of virtual hierarchical architecture and a part of the network of FIG. 1 to that of FIG. 2.
Figure 5:
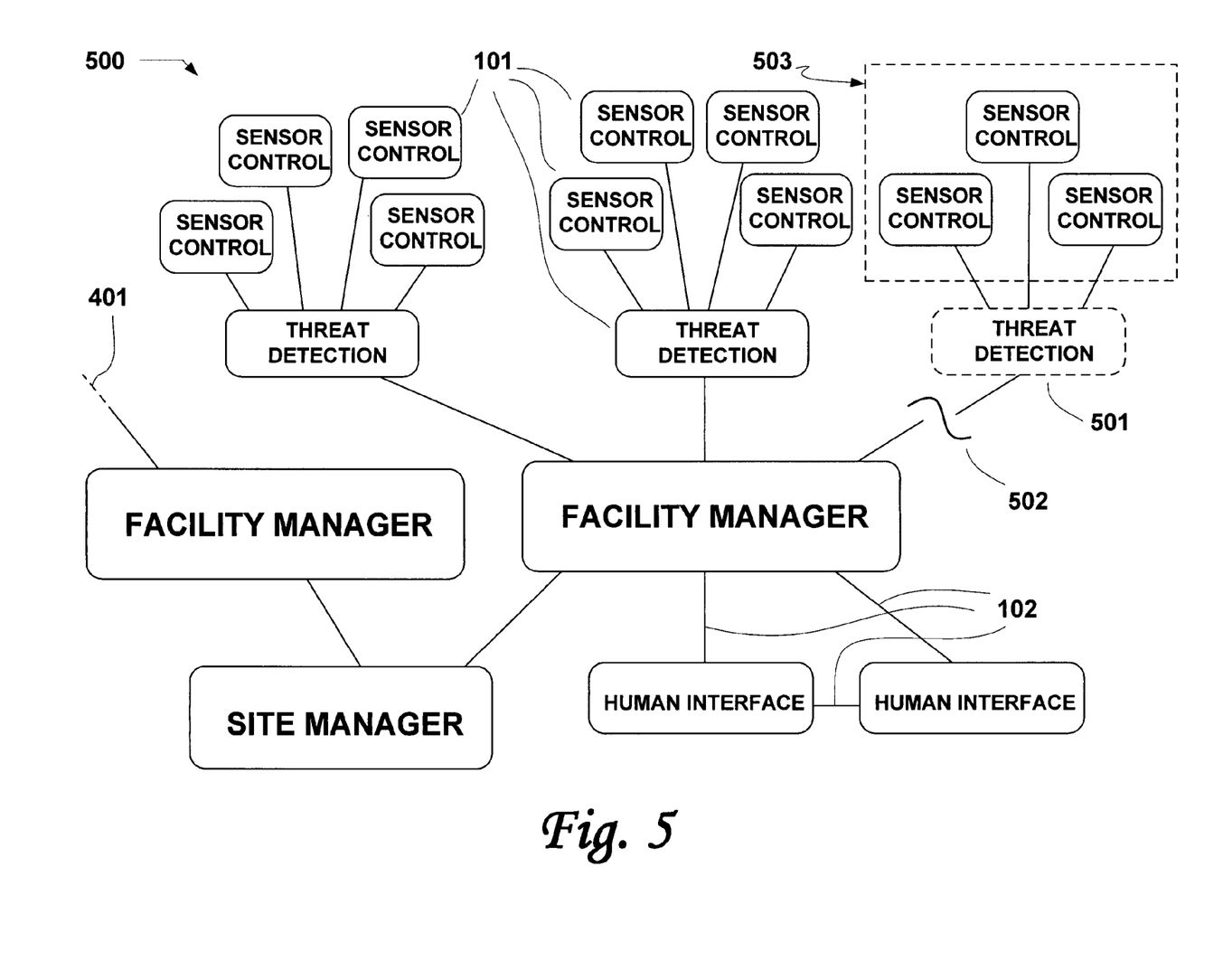
FIG. 5 illustrates the architecture of FIG. 4 with a single compromised intermediate level agent.
Figure 6:
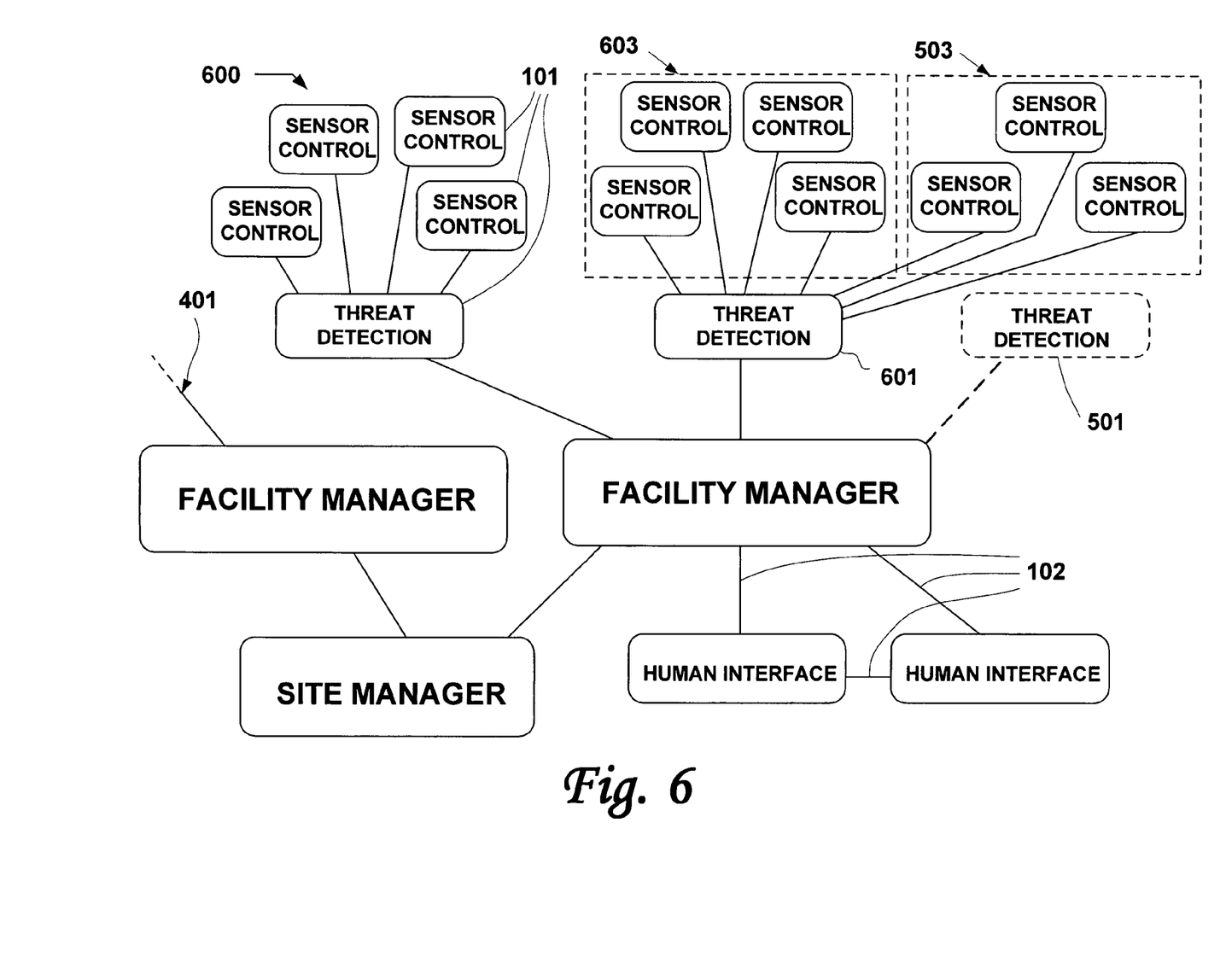
FIG. 6 shows the result of the network of FIG. 5 being "healed" in accordance with an embodiment of the present invention.

FIG. 4 depicts how a "base" virtual hierarchical architecture 400 may form for a security surveillance network protecting a building, termed a "Site." FIG. 4 adds a second Facility Manager agent 101 to the architecture 200 of FIG. 2. This second agent 101 is shown in operable communication with the Site Manager 101 on one end and trailing off at 401 to a next level in the hierarchy (for clarity of the illustration). If the first floor, termed a "Facility," has 50 rooms, each with a Threat Detection agent 101 assigned to the first floor Facility Management agent 101 and the Threat Detection agent 101 of room number 2 dies, a scenario as depicted in FIG. 5 exists. Another agent 101, such as the first floor Facility Manager 101, as depicted in FIG. 6, will immediately assign the Sensor Control agents 101 in room number 2 to the Threat Detection agent 101 for room number 1, for example. The Threat Detection agent 101 in room number 1 will then act as two separate Threat Detection agents 101 and the network experiences almost instantaneous healing via "split/sensor adoption." Likewise, if a Facility Manager agent 101 were to fail, the Site Manager agent 101 would assign appropriate ones of its Threat Detection agents 101 to one or more nearby Facility Manager agents 101. Rules to accomplish this self-healing are discussed below.

EXAMPLE II

Generally, in select embodiments of the present invention used in security applications, there are several "threads" associated with each task or subtask that an agent 101 must accomplish. These threads have priorities that vary with alert levels and command levels established by higher-level agents 101. These subtasks may include: network formation, network healing, ambient hierarchical information collection and exchange, etc. Alert levels may be set as: green—no intruder present, yellow—an intruder has been detected but not classified, red—at least one intruder has been detected and is being tracked.

Conventional security systems rely heavily on human interpretation and maintenance at every level, whereas embodiments of the present invention overcome that limitation. Embodiments of the present invention can track an intruder at high priority while continuing to investigate other ambiguities and continuing to "self-heal" at lower priorities. For example, consider a security guard responding to an intruder alert on one end of a building and another intruder infiltrating the other end of the building. An embodiment of the present invention classifies and tracks the second intruder, alerting security personnel to the real time status of both intruders. This prevents surprises and possibly injury or death. Also, if the intruder(s) is compromising certain portions of the security network, the agents 101 are continually healing the damage to restore the maximum functionality possible, unlike a compromised human. This ability to simultaneously respond on several different fronts is a function of a distributed network used in embodiments of the present invention, as opposed to a centralized physical network comprising intelligent nodes, i.e., agents 101.

A virtual hierarchical architecture 200 implemented in a network makes the system appear to security personnel as a very intelligent conventional flat (fixed) hardware architecture. However, there is much human-like learning and adaptation taking place at all times with which security personnel need not be concerned. It is analogous to having a team of maintenance personal and security advisors functioning continually to assure security personnel have current, "reduced" information from as many sources as possible.

Initially an entire system of agents 101 may be powered up with each having links 102 one to the other as in the example of FIG. 1. It may be redundant in that each agent 101 may be connected to every other agent via fiber optics, wires connected to a fortified fiber-bus run or wireless links via a radio-link network. The latter assures that no matter where security personnel are in a facility, their human interface agents will be in range of one of the network's wireless nodes. If this radio link were compromised, security personnel may tie-in through a quick connect to the fiber-bus "backbone" at access stations located throughout the facility.

In select embodiments of the present invention, a priority task after establishing all links 102 at startup is forming the virtual hierarchical architecture 200. Each agent 101 has its own database and one of its entries is the class of agent 101, e.g., Sensor Control, Threat Detection, Facility Manager, Human Interface, etc. Each agent 101 has a unique identifier, such as an IP address, that it knows. This identifier is used to direct communication to it. The identifier and database for each agent 101 are available at initialization together with other elements that are needed for initialization.

In select embodiments of the present invention, at startup each agent's database creates a "living" list of all the children and grandchildren agents 101 assigned to it. In select embodiments of the present invention, two approaches may be taken. The first is to connect a new agent 101 unannounced and the second is to connect an agent 101 after notifying a Facility Manager agent 101 that the IP of the new agent 101 is being activated.

In select embodiments of the present invention, the first approach may be implemented in two different ways. The new agent 101 may be inserted "silently" so that the next higher level agent 101 must search all possible subnet IP addresses to "link up." Alternatively, the new agent 101 may broadcast its type and IP periodically until it is "adopted" by a higher level agent 101. For example, the alternative comprehends that a Facility Manager agent 101 knows all the assignments of Threat Detection and Sensor Control agents 101 in its domain. When a new agent 101 is added, its IP and agent type are input into the database of the Facility Manager agent 101. The Facility Manager agent 101 compares the two lists to see which agents 101 need to be adopted by a higher level agent 101 at a given time. Thus, the alternative approach may be logical for a fixed facility scenario, whereas, the first method may be most logical for battlefield environments. Examples include radio-linked "agents" 101 dropped into a combat zone from aircraft to enhance situational awareness around a base. For example, a new agent 101, at its landing, determines its location via GPS and announces itself to the existing network to be adopted for immediate use.

As an example, a lower three tiers of a hierarchical architecture may be formed in a network via software in "major class one" of a large network in a building in which all agents 101 are initialized together. For the "silent agent" approach, each Threat Detection agent 101 immediately quizzes each IP on its sub-net, searching for potential Sensor Control agents 101 to adopt. Simultaneously, Facility Manager agents 101 are doing the same thing searching for Threat Detection agents 101. Each agent 101 knows which parent agent 101 it is subject to and which children agents 101 it has adopted. In select embodiments of the present invention, sibling agents 101 have no knowledge of each other, thus each agent 101 can communicate only directly with its parent and its children agents 101. Each agent 101 reports its children agents 101 to its parent agent 101 for storage in a parent database. Thus, if a parent agent 101 loses a child agent 101 due to compromise, the parent agent 101 may assign the "orphaned" grandchildren agents 101 to another of its children agents 101 as a "family services" function.

If this is not a "silent" network (major class one) but rather one in which agents 101 announce themselves, high level agents 101, such as Threat Detection agents 101, investigate each of their children agents' announcements, to check for proximity of the children agent 101 (e.g., Sensor Control agent 101). Each agent 101 "knows" that its location and IP address contains some information that is used by the adoption algorithms in all methods. As the hierarchy is formed, the IP addresses of children agents 101, including grandchildren agents 101 by child and parent agents 101, are stored in the database of that agent 101.

In select embodiments of the present invention, in the second class ("major class two"), hierarchy formation occurs by a high level agent 101, e.g., a third tier Facility Manager agent 101, first polling a list of mid-level agents 101, e.g., second tier Threat Detection agents 101, and deciding which to adopt. The high level agent 101, e.g., Facility Management agent 101, passes a list of low-level agents 101, e.g., first tier Sensor Control agents 101, to the mid-level agents 101, e.g., Threat Detection agents 101, that the high level agent 101, e.g., Facility Manager agent 101, has adopted. The mid-level agent 101, e.g., Threat Detection agent 101, adopts the low-level agents 101, e.g., Sensor Control agents 101, and the virtual architecture 200 is formed with each agent 101 knowing its children, grandchildren, and parent.

Although there may be several methods of response to agent compromise, an optimum method is to have the grandparent agent 101 assign its grandchildren agents 101, i.e., the children agents 101 of the compromised agent 101 "live" to one of the grandparent agent's other "living" children agents 101 for adoption. An example of this is shown in FIGS. 5 and 6.

In FIG. 5, a Threat Detection agent 501 ("mid-level" parent) is compromised causing a break 502 in the virtual architecture 500. This isolates a group 503 of three Sensor Control children agents 101.

Refer to FIG. 6. A Threat Detection sibling agent 601 of the compromised Threat Detection agent 501 assumes the "parenting" responsibility for the group 503 of Sensor Control agents 101 and maintains two separate "households" (clusters) 503, 603 of Sensor Control agents 101. Each cluster 503, 603 of Sensor Control agents 101 has separate fields of influence and each Sensor Control agent 101 in a particular cluster 503, 603 shares its field of influence with the others in its cluster 503, 603. Thus, the hierarchical architecture 400 of FIG. 4 is modified in FIG. 6 so that two Threat Detection agents 501, 601 share the same IP address. The original IP address for the compromised agent 501 is inoperable, thus the children agents 101 in the household (cluster) 503 are redirected to an adoptive parent agent 601. Note that in the above examples, the "repair" is performed in software and is to the superimposed virtual hierarchical architecture 500 itself, not the individual agents 101. If physical damage is done to the links 102 or the agents 101 themselves, a separate repair, usually physical, is necessary even though the network itself continues to function.

In select embodiments of the present invention, a virtual hierarchical architecture 200 has modes of adaptation other than addition, substitution, and removal of agents 101 as described above. For example, mobile agents 101 may relocate to other "households" of agents 101, thus reforming the virtual architecture 200. Such mobile agents 101 may reside in a robot (not shown separately) with onboard sensors (not shown separately). The robot is treated as a Mobile Threat Detection agent 101 incorporating self-tracking. The robot monitors its changing location and updates its database for possible reassignment (asset transfer) by its parent agent 101, e.g., a Facility Manager agent 101. Thus, if the robot moves from room A to room B, the database of its parent agent 101 is updated by the parent agent 101 accordingly and the robot asset may be transferred to the Facility Manager agent 101 for Room B. The location of any integral Sensor Control agents 101 move with the robot. Thus, the Sensor Control agents 101 are also mobile, although fixed in configuration upon the robot. In select embodiments of the present invention, higher level agents, e.g., Facility Manager or Human Interface agents 101, may determine whether their robot "mobile child" moves in a predetermined course or is dispatched to cover particular areas. The addition of mobile agents 101 also establishes another vehicle for self-healing, e.g., dispatching a robotic Threat Detection agent 101 incorporating Sensor Control agents 101 to cover compromise of fixed Sensor Control agents 101 in an area.

EXAMPLE III

A multi-agent system may comprise agents of the following types:
Sensor Control agents 101 at level "0," with capability to:
search for a parent agent 101, i.e., a Threat Assessment agent 101 at level "1";
respond to requests for information (alert status, locality, adoptive parent, etc.);
assess alert status; and
send alert status to parent agent 101.
Threat Assessment agents 101 at level "1," with capability to:
search for a parent agent 101, i.e., a Management agent at level "2;"
respond to requests for information (alert status, locality, children status, parent status, etc.);
assess alert status that may include requests for information;
send alert status to parent agent 101;
assess efficiency status; and send efficiency status.

Management agent at level "2," with capability to:
- search for a parent at Management agent level "3;"
- respond to requests for information (alert status, locality, grandchildren, children, parent, etc.)
- assess alert status
- send alert status to parent agent 101;
- assess efficiency status;
- send efficiency status; and
- request transfer of grandchildren agents 101.

Although only a few exemplary embodiments of this invention have been described in detail above, those skilled in the art will readily appreciate that many modifications are possible in the exemplary embodiments without materially departing from the novel teachings and advantages of the invention. For example, although facility security networks were used as examples, any configuration, hardware or software, that uses elements of agents to control functions and needs to reliably continue operation or "live repair" itself while operating, would benefit from the embodiments and methods of employment of the present invention. Accordingly, all such modifications are intended to be included within the scope of this invention as defined in the following claims.

The abstract is provided to comply with the rules requiring an abstract, which will allow a searcher to quickly ascertain the subject mater of the technical disclosure of any patent issued from this disclosure. 37 CFR § 1.72(b). Any advantages and benefits described may not apply to all embodiments of the invention.

We claim:

1. An automated self-healing configuration for use with automated equipment establishing a distributed network incorporating nodes, comprising:
   computer readable media and uniquely identifiable elements comprising at least in part hardware, said elements cooperating to accomplish at least one task, each said element having at least one function, each said element able to communicate with any other of said elements via at least one link in a flat architecture,
wherein when a said element is instantiated, it automatically finds its own connections, and automatically forms an efficient communication hierarchy as semi-optimal decision trees for fast, efficient and reliable communication; and
   computer readable media incorporating at least one hierarchical architecture superimposed on said flat architecture to specify which said links are employed in a particular scenario,
wherein said superimposed hierarchical architecture automates said decision trees to minimize communication from a lowest level said node to a highest level said node, and
wherein said configuration automatically maintains self-ascertained necessary connections and a hierarchy if one or more said nodes are removed or overloaded, and
wherein at least a specified one of said elements assumes at least one function of any said element that is compromised during operation of said configuration, and
wherein said elements are not required to share data resources, and
wherein said configuration makes available for sharing only relevant time-sensitive data to minimize information overload.

2. The configuration of claim 1 further comprising rules incorporated in said software,
   wherein said rules specify which said links are employed in a specified scenario.

3. The configuration of claim 1 in which at least parts of said elements are implemented in hardware and at least one of said functions is a control function.

4. The configuration of claim 3 in which said configuration is built starting from said flat architecture,
   wherein said flat architecture is established at least partly as a hardware architecture.

5. The configuration of claim 3 in which said configuration is a network and at least some of said elements are agents, each said agent maintaining an IP address and at least one database with one entry in at least one of said databases being the class of said agent.

6. The configuration of claim 5 in which each said agent has at least one control function.

7. The configuration of claim 5 in which each said agent has at least one management function.

8. The configuration of claim 5 in which at least some of said elements are not agents.

9. The configuration of claim 5 in which new said agents are added unannounced.

10. The configuration of claim 5 in which new said agents are added and announced to at least one parent agent.

11. The configuration of claim 5 in which at least one said rule governs collaboration among said agents,
    wherein said rules may be implemented via messaging, said messaging determining the agents that a specified agent may communicate with and insuring that each said agent is able to communicate up said immediately above existing level and down said immediately below existing level in said hierarchical architecture that establishes said distributed network, and
    wherein at least each said agent abides by said rules so that after initiation of said software, said distributed network appears as a fixed hierarchical architecture.

12. The configuration of claim 5 in which each said agent is responsible for maintaining awareness only of their currently assigned said parent agent, if any, that are one level above said agent in said hierarchical architecture and their currently assigned children agents, if any, that are one level below said agent in said hierarchical architecture,
    wherein said responsibility for awareness of only said parent agent, if any, and said children agents, if any, reduces the number of required said links in said configuration such that only links necessary to establish said hierarchical structure are enabled.

13. The configuration of claim 12 in which each said database of said agent includes at least in part a list of any said parent agents and any said children agents assigned thereto.

14. The configuration of claim 13 in which said agents at least comprise:
    a first type termed the Agent Name and Type Server (ANATS) agent; and
    a second type termed the Hierarchical Self-Healing Network (HSHN) agent,
wherein said HSHN agents form said decision trees;
wherein at least one said ANATS agent maintains a directory of existing said HSHN agents, and
wherein when a request is made to said ANATS agent by one said agent for information about a said HSHN agent of a certain type, said ANATS agent sends said directory entry for said HSHN agent of a certain type to said requesting agent, and
wherein after said directory entry is made, a countdown counter is started, and
wherein after a pre-specified time elapses after said counter is started, the status of said directory entry is moved to the next lower status and said timer is re-started, and wherein a hierarchy of said status from high to low is "exists," "unconfirmed," and "non-existent," and wherein a "grace copy" is an unconfirmed entry.

15. Rules for implementing the configuration of claim 14 in which said ANATS agent employs said rules in order of priority, said rules comprising:

if said directory entry timer of a said existing HSHN agent reaches zero and it is an "unconfirmed" said directory entry, remove said HSHN agent from said directory;

if said directory entry timer of a said existing HSHN agent reaches zero and said entry is not a "grace copy," send a verification request to said existing HSHN agent and establish said entry in said directory as "unconfirmed;"

if a said HSHN agent sends an "IamHere" message, add said HSHN agent to said directory and if there is an existing copy of a listing or a said "grace copy" of a listing remove said existing copy or said "grace copy" and send an "ANATSConfirm" message; and if a said HSHN agent sends an "AgentFromType" message, return the next instance of the requested type of said HSHN agent in an "AgentFromTypeResponse" message.

16. The rules of claim 15 in which ANATS rules for said HSHN agents further comprise:

a first rule that if said ANATS agent has not acknowledged existence of said HSHN agent and said timer has not expired, wait for a response;

wherein each said agent has a perception of its environment including other said agents existing therein;

a second rule that if said ANATS agent has not acknowledged existence of said HSHN agent and said timer has expired, send a message to said ANATS agent and start a wait timer;

if a confirmation is received from said ANATS agent, set an acknowledgement flag to ignore said first and second rules; and if said ANATS agent requests proof of the existence of a said HSHN agent, reset said acknowledgement flag to activate said second rule, wherein if said HSHN agent is incapacitated, after said timer expires said ANATS agent changes the status of said HSHN agent to "non-existent" and removes said HSHN agent from said directory.

17. The rules of claim 16 in which parent processing rules for said HSHN agents comprise:

if said state of said parent HSHN agent is "unconfirmed" and a message is sent to said parent HSHN agent, wait for a response;

if said state of said parent HSHN agent is "non-existent" request a new name from said ANATS agent;

if said state of said parent HSHN agent goes to "unconfirmed" send a message to said parent HSHN agent for confirmation;

if said ANATS agent sends a name of said parent HSHN agent and the current said state of said parent HSHN agent is "nada", replace the current said parent HSHN agent with a new said parent HSHN agent and set the status of said new parent HSHN agent to "unconfirmed" and send a message to said new parent HSHN agent for confirmation;

if said current parent HSHN agent replies, set the status of said current parent HSHN agent to "exists;" and if said current parent HSHN agent requests confirmation of existence of said new parent HSHN agent, set said state of said new parent HSHN agent to "unconfirmed" and send a message to said new parent HSHN agent for confirmation.

18. The rules of claim 17 in which parent processing rules for said HSHN agents further comprise rules for child said HSHN agents comprising:

if said state of a said child HSHN agent goes to "non-existent" remove said child HSHN agent from said directory list of said parent HSFIIN agent;

if said state of a said child HSHN agent goes to "unconfirmed" send a request for a child verification message to said child HSHN agent;

if a said child HSHN agent sends a message to said parent HSHN agent, if said parent HSHN agent is in a said state "exists," said parent HSHN agent adds said child HSHN agent to said directory list of said parent HSHN agent with the state "exists" and removes prior entries of said child HSHN agent and said parent HSHN agent responds to said child HSHN agent with a confirmation message.

19. The configuration of claim 14 further comprising a load balancing function implemented in said software.

20. The configuration of claim 5 in which at least one of said hierarchical architectures has at least two levels.

21. The configuration of claim 20 in which said agents may be added or subtracted to at least one of said levels via at least one self-forming attribute provided in said software.

22. The configuration of claim 21 in which said configuration permits changes thereto without need for interrupting operation of said configuration.

23. The configuration of claim 21 in which said configuration is scalable, wherein selected said hierarchical levels may be changed via said software to alter the number of said nodes via said self-forming function implemented in said software.

24. The configuration of claim 21 in which said elements further comprise at least in part physically mobile hardware.

* * * * *